United States Patent
Woodward et al.

(10) Patent No.: US 12,361,071 B2
(45) Date of Patent: Jul. 15, 2025

(54) SYSTEMS AND METHODS FOR MACHINE LEARNING CLASSIFICATION-BASED AUTOMATED REMEDIATIONS AND HANDLING OF DATA ITEMS

(71) Applicant: DryvIQ, Inc., Ann Arbor, MI (US)

(72) Inventors: Steve Woodward, Canton, MI (US); Shaun Becker, Canton, MI (US); Stefan Larson, Dexter, MI (US)

(73) Assignee: DryvIQ, Inc., Ann Arbor, MI (US)

( * ) Notice: Subject to any disclaimer, the term of this patent is extended or adjusted under 35 U.S.C. 154(b) by 0 days.

(21) Appl. No.: 17/866,386

(22) Filed: Jul. 15, 2022

(65) Prior Publication Data

US 2023/0017384 A1  Jan. 19, 2023

Related U.S. Application Data

(60) Provisional application No. 63/222,263, filed on Jul. 15, 2021.

(51) Int. Cl.
 *G06F 16/906* (2019.01)
 *G06F 16/9038* (2019.01)
 *G06F 16/908* (2019.01)

(52) U.S. Cl.
 CPC ........ *G06F 16/906* (2019.01); *G06F 16/9038* (2019.01); *G06F 16/908* (2019.01)

(58) Field of Classification Search
 CPC ............... G06F 16/906; G06F 16/9038; G06F 16/908
 USPC ....................................................... 707/736
 See application file for complete search history.

(56) References Cited

U.S. PATENT DOCUMENTS

| | | | | |
|---|---|---|---|---|
| 7,958,147 B1 * | 6/2011 | Turner | ................... | G06F 21/604 707/694 |
| 7,974,984 B2 * | 7/2011 | Reuther | ................... | G06F 16/35 707/777 |
| 8,234,263 B2 * | 7/2012 | Pradhan | ................... | G06F 16/93 707/711 |
| 8,341,734 B1 * | 12/2012 | Hernacki | ................ | G06F 16/24 380/243 |
| 8,458,154 B2 * | 6/2013 | Eden | ....................... | G06F 40/40 707/753 |
| 8,521,772 B2 * | 8/2013 | King | ....................... | G06F 16/433 358/448 |
| 9,614,826 B1 * | 4/2017 | McCorkendale | ....... | H04L 63/08 |
| 10,162,850 B1 * | 12/2018 | Jain | ......................... | G06N 20/00 |
| 10,451,712 B1 * | 10/2019 | Madhow | ............... | G01S 13/723 |
| 10,685,188 B1 * | 6/2020 | Zhang | ................... | G06F 40/263 |
| 10,817,619 B1 * | 10/2020 | Kolli | ...................... | G06F 21/552 |
| 10,979,461 B1 * | 4/2021 | Cervantez | ............. | H04L 63/105 |
| 10,983,963 B1 * | 4/2021 | Venkatasubramanian | ................... | G06F 16/1824 |
| 10,990,767 B1 * | 4/2021 | Smathers | ............... | G06F 16/322 |
| 11,003,773 B1 * | 5/2021 | Fang | ....................... | G06N 20/00 |

(Continued)

*Primary Examiner* — Tony Mahmoudi
*Assistant Examiner* — Michael Le
(74) *Attorney, Agent, or Firm* — Padowithz Alce; Alce PLLC

(57) ABSTRACT

Systems and methods for automated digital filing includes classifying digital files and curating a number of corpora of digital files based on the classifications associated with each of the digital files. In response to the classification label associated with each distinct corpus of digital files, selectively executing a set of computer instructions associated with the classification label that, when executed, modifies a digital state of a target corpus of digital files.

17 Claims, 7 Drawing Sheets

(56) References Cited

U.S. PATENT DOCUMENTS

| | | | | |
|---|---|---|---|---|
| 11,151,660 | B1* | 10/2021 | Harding | G06Q 40/08 |
| 11,157,475 | B1* | 10/2021 | Cobb | G06N 20/00 |
| 11,256,609 | B1* | 2/2022 | Agrawal | G06F 11/3684 |
| 11,487,825 | B1* | 11/2022 | Dargude | G06F 18/214 |
| 11,714,842 | B1* | 8/2023 | Sharma | G06F 16/183 |
| | | | | 707/736 |
| 2002/0198855 | A1* | 12/2002 | Jameson | G06F 16/10 |
| | | | | 706/45 |
| 2005/0278321 | A1* | 12/2005 | Vailaya | G16B 50/30 |
| 2006/0095830 | A1* | 5/2006 | Krishna | G06Q 10/04 |
| | | | | 715/201 |
| 2006/0247973 | A1* | 11/2006 | Mueller | G06Q 20/20 |
| | | | | 705/26.1 |
| 2008/0154651 | A1* | 6/2008 | Kenefick | G06Q 40/08 |
| | | | | 705/4 |
| 2009/0037479 | A1* | 2/2009 | Bolik | G06F 16/185 |
| 2009/0063470 | A1* | 3/2009 | Peled | G06F 40/295 |
| | | | | 707/999.005 |
| 2014/0046954 | A1* | 2/2014 | MacLean | G06F 21/645 |
| | | | | 707/736 |
| 2015/0347212 | A1* | 12/2015 | Bartley | G06F 11/0709 |
| | | | | 714/37 |
| 2016/0260023 | A1* | 9/2016 | Miserendino, Jr. | G06N 20/00 |
| 2016/0300288 | A1* | 10/2016 | Nemery De Bellevaux | |
| | | | | G06Q 30/0282 |
| 2016/0330217 | A1* | 11/2016 | Gates | H04L 63/1441 |
| 2017/0093918 | A1* | 3/2017 | Banerjee | H04L 41/0895 |
| 2017/0228659 | A1* | 8/2017 | Lin | G06N 5/04 |
| 2018/0293400 | A1* | 10/2018 | Borup | G06F 21/554 |
| 2018/0307810 | A1* | 10/2018 | Hanusiak | G06F 16/148 |
| 2019/0014222 | A1* | 1/2019 | O'Hagan | G06F 3/1273 |
| 2019/0044978 | A1* | 2/2019 | Barday | G06F 21/552 |
| 2019/0050596 | A1* | 2/2019 | Barday | H04L 63/1433 |
| 2019/0251193 | A1* | 8/2019 | Singuru | G06F 16/93 |
| 2019/0319987 | A1* | 10/2019 | Levy | H04L 63/083 |
| 2019/0354583 | A1* | 11/2019 | Ralhan | G06N 7/005 |
| 2019/0384699 | A1* | 12/2019 | Arbon | G06N 3/006 |
| 2020/0005032 | A1* | 1/2020 | Freed | G06Q 10/10 |
| 2020/0012814 | A1* | 1/2020 | Brannon | G06F 21/6245 |
| 2020/0174966 | A1* | 6/2020 | Szczepanik | G06F 16/13 |
| 2020/0210484 | A1* | 7/2020 | Shlyunkin | G06F 16/90328 |
| 2020/0274895 | A1* | 8/2020 | Kulaga | G06F 16/906 |
| 2020/0279004 | A1* | 9/2020 | Serdy | G06F 16/906 |
| 2020/0327162 | A1* | 10/2020 | Pevtsov | G06F 16/90335 |
| 2020/0364404 | A1* | 11/2020 | Priestas | G06V 30/19173 |
| 2020/0394327 | A1* | 12/2020 | Childress | G06F 16/1824 |
| 2021/0026897 | A1* | 1/2021 | Rathje | G06F 16/3344 |
| 2021/0049516 | A1* | 2/2021 | Rapp | G06N 20/00 |
| 2021/0056510 | A1* | 2/2021 | Raghavan | G06V 30/413 |
| 2021/0064866 | A1* | 3/2021 | Rezvani | G06K 9/6254 |
| 2021/0117571 | A1* | 4/2021 | Prakash | G06F 16/285 |
| 2021/0174218 | A1* | 6/2021 | Miller | G06N 20/00 |
| 2021/0286875 | A1* | 9/2021 | Herman-Saffar | G06F 21/56 |
| 2021/0295104 | A1* | 9/2021 | Squires | G06F 16/176 |
| 2021/0295202 | A1* | 9/2021 | Squires | G06F 9/451 |
| 2022/0012268 | A1* | 1/2022 | Ghoshal | G06F 16/906 |
| 2022/0156242 | A1* | 5/2022 | He | G06F 16/2365 |
| 2022/0207163 | A1* | 6/2022 | Gentleman | G06F 21/62 |
| 2022/0207429 | A1* | 6/2022 | Haribhakti | G06N 20/10 |
| 2022/0414369 | A1* | 12/2022 | Makani | G06V 30/19147 |

* cited by examiner

Sourcing / Accessing Data Items via Data Handling API 210

Data Handling Pipeline | Data Item Classification(s) 220

Machine Learning-Based Data Item Classifier(s) 220i

Heuristic-Based Data Item Classfier(s) 220ii

Data Handling Pipeline | Sensitivity Scoring Stage 230

Configuring Automated Actions + Automated Remediation Workflows 240

Label-Informed Automated Remediation Actions | ML Score-Informed Automated Remediation Workflows 250

FIGURE 2

SYSTEMS AND METHODS FOR MACHINE LEARNING CLASSIFICATION-BASED AUTOMATED REMEDIATIONS AND HANDLING OF DATA ITEMS

CROSS-REFERENCE TO RELATED APPLICATIONS

This application claims the benefit of U.S. Provisional Application No. 63/222,263, filed on Jul. 15, 2021, which is incorporated in its entirety by this reference.

TECHNICAL FIELD

This invention relates generally to the data handling and data governance fields, and more specifically to a new and useful systems and methods for machine learning-based classifications of data items for sensitivity-informed handling and governance in the data handling and data governance fields.

BACKGROUND

Evolving data security and data compliance risks are some of the factors that may be driving entities to take different approaches to handling their data including reorganizing their data from decentralized and often complex storage systems to centralized, cloud-based storage architectures. Additionally, misclassified digital items and unstructured digital items may further complicate attempts to successfully govern and/or manage digital items throughout any type of storage system.

In traditional on-premises data storage and nonintegrated or disjointed storage architectures, identifying data files and content that may include potentially sensitive information and further managing permissions for controlling access to files and content having high security threat and compliance risks can be especially difficult.

Thus, there are needs in the data handling and data governance fields to create improved systems and methods for intelligently handling data and providing intuitive data governance and controls that curtail the several data security and data compliance risks posed by legacy data storage and management architectures.

The embodiments of the present application described herein provide technical solutions that address, at least the needs described above.

BRIEF SUMMARY OF THE INVENTION(S)

A machine learning-informed method implemented by one or more computers executing automated workflows for digital file handling, the method comprising: at a remote digital file handling service: computing, by one or more file classification machine learning models, at least one machine learning classification inference for each of a plurality of distinct digital files of a corpus of digital files; curating a plurality of distinct sub-corpora of digital files based on the at least one machine learning classification inference associated with each of the plurality of distinct digital files of the corpus of digital files, wherein the at least one machine learning classification inference comprises a digital file type classification inference of a plurality of distinct digital file type classification inferences; and selectively executing, by one or more computers, an automated digital file handling workflow for at least one sub-corpus of the plurality of distinct sub-corpora of digital files based on the digital file type classification inference, wherein the automated digital file handling workflow includes a sequence of computer-executable tasks that, when executed, operate to modify one or more of a storage residency, access permissions, and digital file metadata associated with each of the distinct digital files of the sub-corpus.

In one embodiment, the method includes for each distinct digital file of the corpus of digital files: converting the at least one classification inference associated with a respective distinct to one digital file type classification label of a plurality of distinct digital file type classification labels; and associating the one digital file type classification label to the respective distinct digital file; wherein curating the plurality of distinct sub-corpora of digital files includes composing each distinct sup-corpus of the plurality of distinct sub-corpora based on the one digital file type classification, wherein each distinct sub-corpus comprises one or more digital files associated with a distinct one of the plurality of digital file type classifications.

In one embodiment, the method includes configuring the automated digital file handling workflow includes: (i) selecting, via a graphical user interface, two or more distinct digital file handling actions; (ii) tethering the two or more distinct digital file handling actions into the sequence of computer-executable tasks using one or more logic instructions.

In one embodiment, the method includes executing a simulation of the automated digital file handling workflow, wherein the executing includes: (i) setting, as simulation input, a simulation corpus comprising a plurality of digital file samples; and (ii) in response to setting the simulation corpus, computing results of the simulation; deploying the automated digital file handling workflow if the results of the simulation satisfy an efficacy threshold.

In one embodiment, the method includes configuring the automated digital file handling workflow includes: converting digital policy criteria of a target digital file handling policy to digital decisioning logic for automatically handling one or more target digital files of a subscriber, wherein the converting includes setting or defining at least one distinct computer-executable task of the automated digital file handling workflow to each distinct criterion of the digital file handling policy.

In one embodiment, curating the plurality of distinct sub-corpora of digital files includes tuning one or more digital file curation criteria including: (i) setting a minimum confidence threshold for the digital file type classification inference; and (ii) setting one or more digital file feature criteria using Boolean logic.

In one embodiment, the method includes computing, by one or more sensitivity classification machine learning models, at least one machine learning sensitivity inference for each of the plurality of distinct digital files of the corpus of digital files, wherein the at least one machine learning sensitivity inference relates to a machine learning-derived probability or likelihood that a target digital file contains access-restricted content data as defined by digital file handling policy of a subscriber to the remote digital file handling service.

In one embodiment, the method includes computing a digital content risk score for each of the plurality of distinct digital files of the corpus of digital files based on the at least one machine learning sensitivity inference computed for each of the plurality of distinct digital files of the corpus.

In one embodiment, the method includes identifying a digital file handling policy of a subscriber associated with the corpus of digital files for each of the plurality of distinct digital files based on the at least one machine learning classification inference for each of the plurality of distinct digital files; and computing a digital content risk score for each of the plurality of distinct digital files of the corpus of digital files based on: (a) the at least one machine learning sensitivity inference computed for each of the plurality of distinct digital files of the corpus; and (b) the digital file handling policy of the subscriber.

In one embodiment, the method includes identifying, via a graphical user interface, a distinct sub-corpus of digital files of the plurality of distinct sub-corpora of digital files having a distinct digital content risk score satisfying a content risk threshold; and automatically, via the graphical user interface, at least one automated digital file handling workflow that mitigates the distinct digital content risk score of the distinct sub-corpus of digital files.

In one embodiment, wherein: the remote digital file handling service stores a plurality of distinct digital file handling policies of the subscriber, and each distinct digital file handling policy includes one or more predefined instructions for modifying a state of a target digital file based on a machine learning-based inference relating to content of the target digital file.

In one embodiment, the method includes downloading, from one or more computers of a subscriber, the corpus of digital files to the remote digital file handling service, wherein the corpus of digital files comprises a first set of digital files having structured data and a second set of digital files having unstructured data of the subscriber.

In one embodiment, the automated digital file handling workflow includes the sequence of computer-executable tasks that, when executed, automatically alters a storage residence of a target digital file from a first storage location within a file system to a second storage location within a distinct file system.

In one embodiment, the automated digital file handling workflow includes the sequence of computer-executable tasks that, when executed, automatically alters a permissioning state of a target digital file from a first access permissions to a second access permissions.

In one embodiment, curating the plurality of distinct sub-corpora of digital files includes composing a distinct sup-corpus of digital files of the plurality of distinct sub-corpora that includes a plurality of distinct digital files having associated machine learning classification inferences that do not satisfy a classification confidence threshold, the classification confidence threshold relates to a minimum classification confidence value associated with a machine learning classification inference that enables a categorization or routing of a target digital file into a recognized digital file classification of a plurality of distinct recognized digital file classifications of a subscriber to the remote digital file handling service.

In one embodiment, the digital file type classification inference relates to a machine learning prediction of a recognized digital file type of a plurality of distinct recognized digital file types of a subscriber to the remote digital file handling service.

In one embodiment, a machine learning-informed method implemented by one or more computers executing automated workflows for digital file handling includes computing, by one or more digital content classification machine learning models, at least one machine learning classification inference for each of a plurality of distinct items of digital content of a corpus of items of digital content; curating a plurality of distinct sub-corpora of items of digital content based on the at least one machine learning classification inference associated with each of the plurality of distinct items of digital content of the corpus of items of digital content, wherein the at least one machine learning classification inference comprises a digital content type classification inference of a plurality of distinct items of digital content type classification inferences; and selectively executing, by one or more computers, an automated digital content handling workflow for at least one sub-corpus of the plurality of distinct sub-corpora of items of digital content based on the item of digital content type classification inference, wherein the automated digital content handling workflow includes a sequence of computer-executable tasks that, when executed, operate to modify one or more of a residency, permissions, and file metadata associated with each of the distinct items of digital content of the sub-corpus.

BRIEF DESCRIPTION OF THE FIGURES

FIG. 2 illustrates an example method 200 in accordance with one or more embodiments of the present application;

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Intelligent Content Handling and Content Governance

Figure 1:
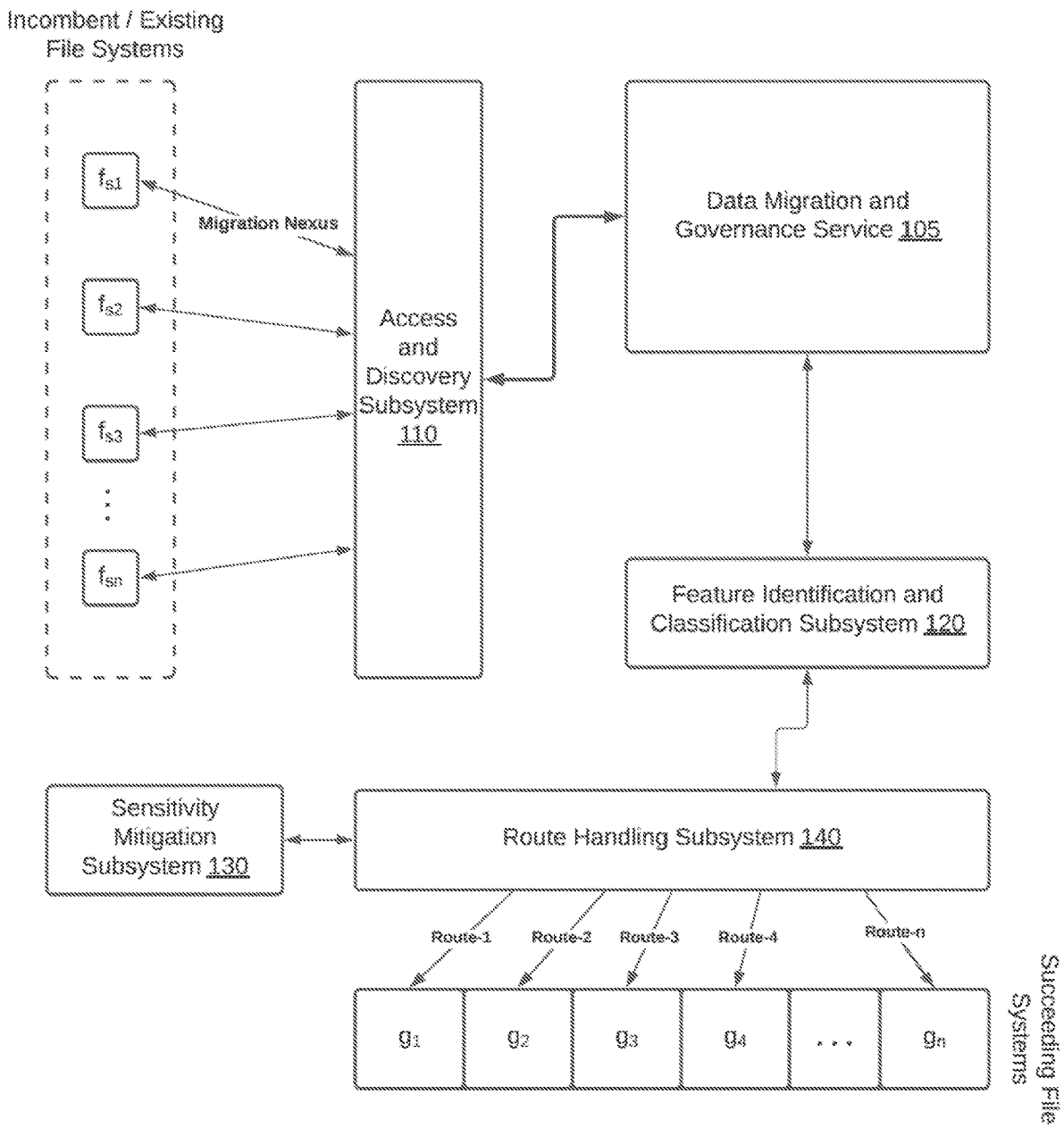
FIG. 1 illustrates a schematic representation of a system 100 in accordance with one or more embodiments of the present application.
Figure 3:
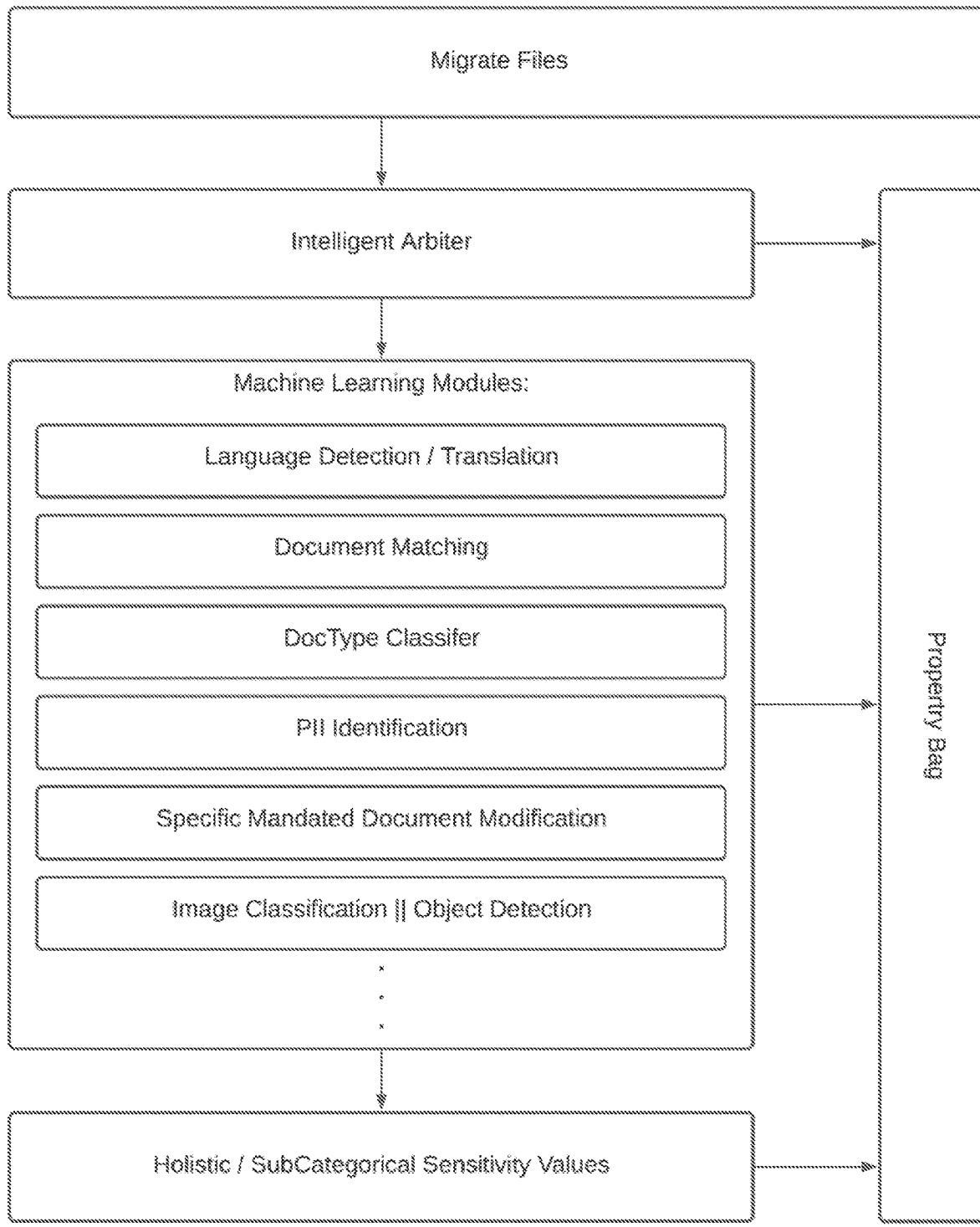
FIG. 3 illustrates a schematic representation of a first implementation of one or more sub-components of the system 100 in accordance with one or more embodiments of the present application.
Figure 4:
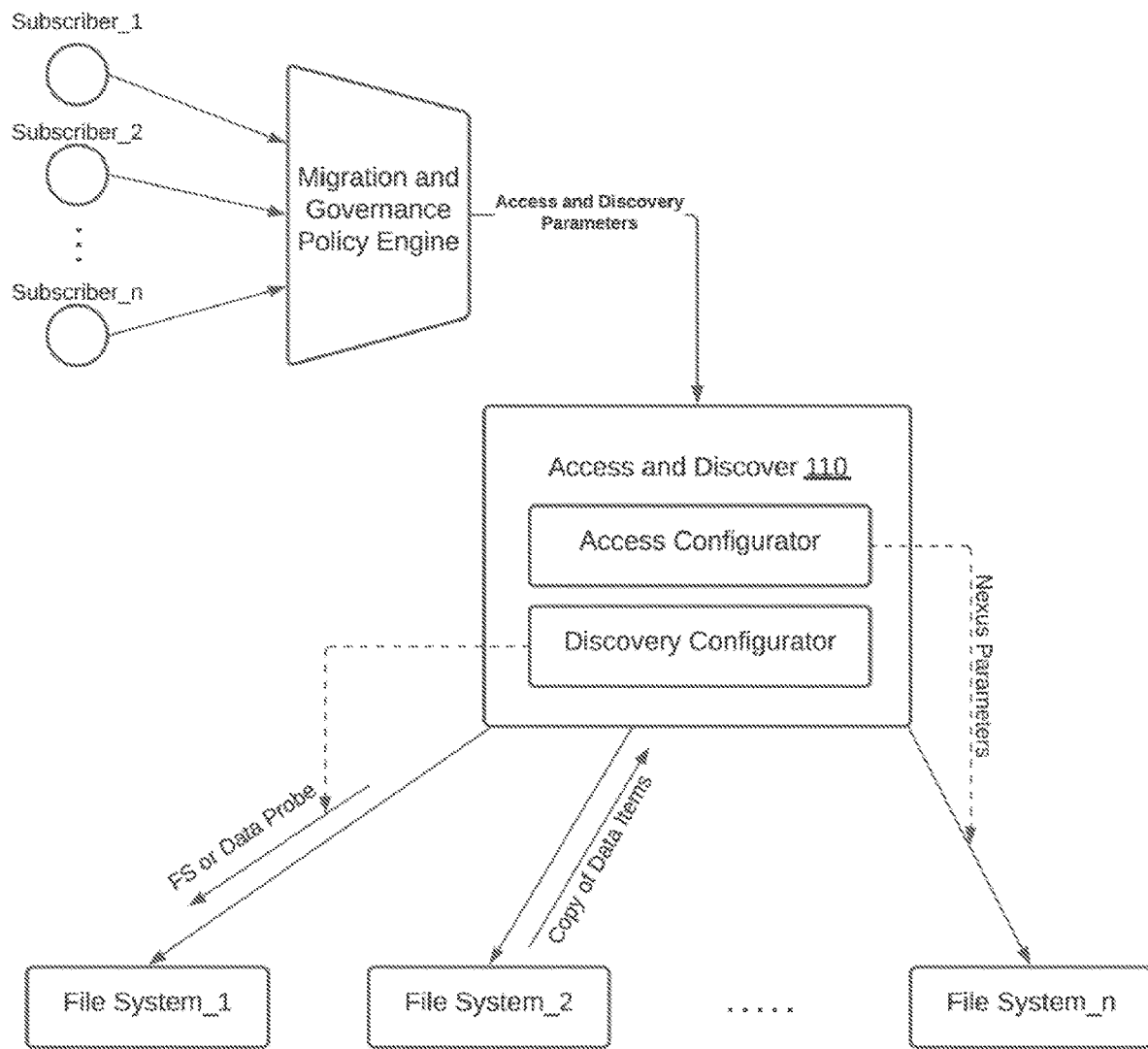
FIG. 4 illustrates a schematic representation of a second implementation of one or more sub-components of the system 100 in accordance with one or more embodiments of the present application.
Figure 5:
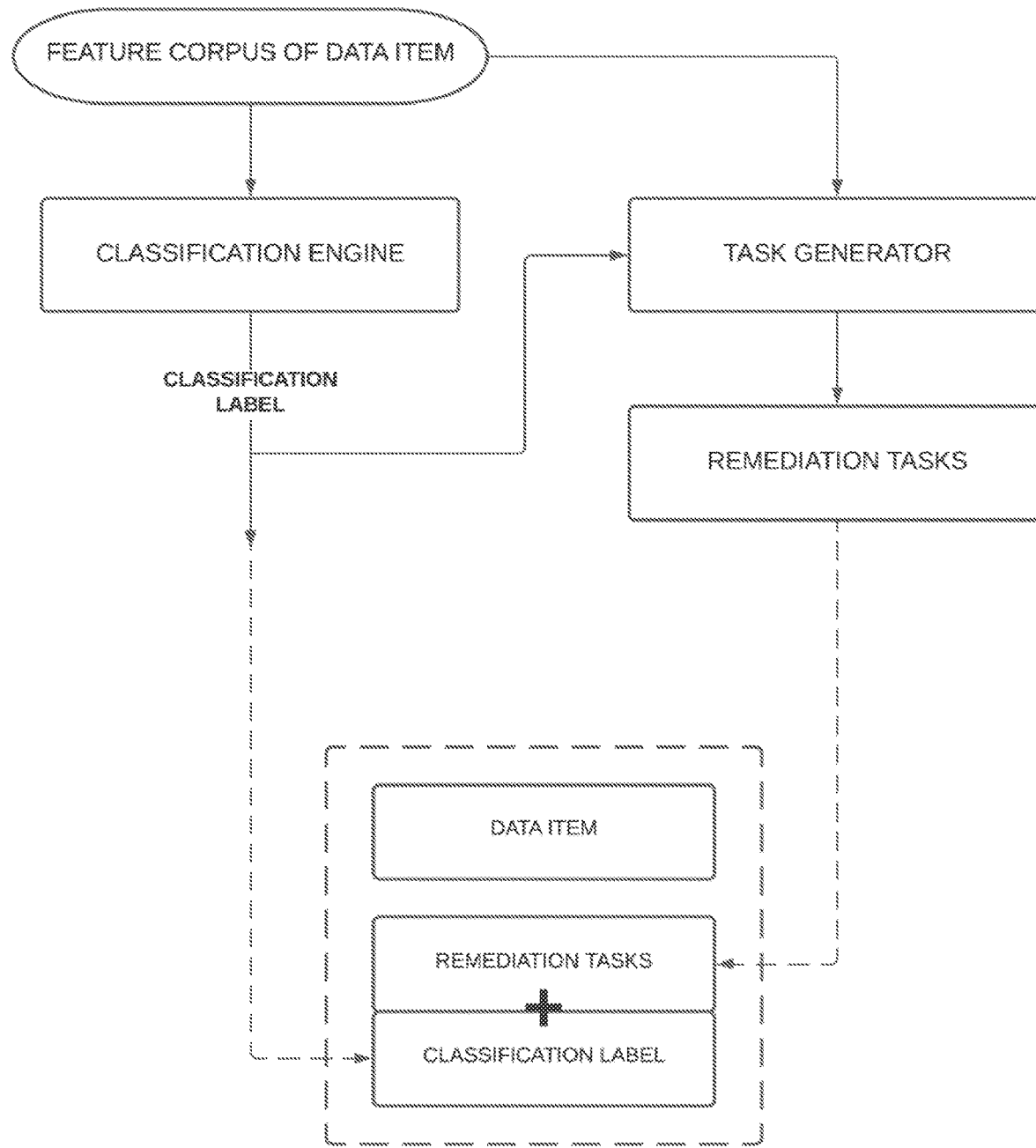
FIG. 5 illustrates a schematic representation of an example for generating action tasks for a data item in accordance with one or more embodiments of the present application.
Figure 6:
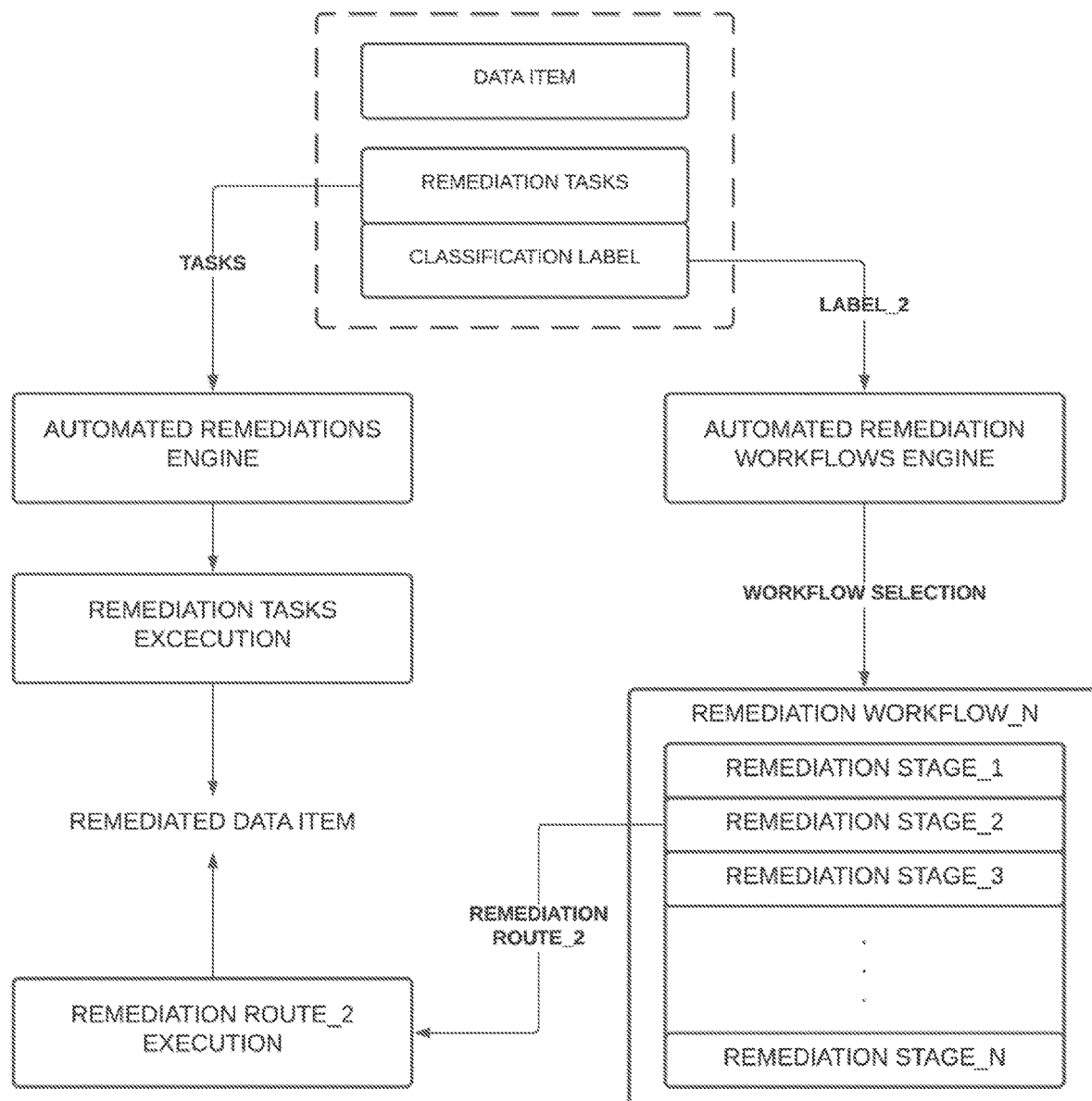
FIG. 6 illustrates a schematic representation of an example for implementing a remediation stage for handling a data item in accordance with one or more embodiments of the present application.
Figure 7:
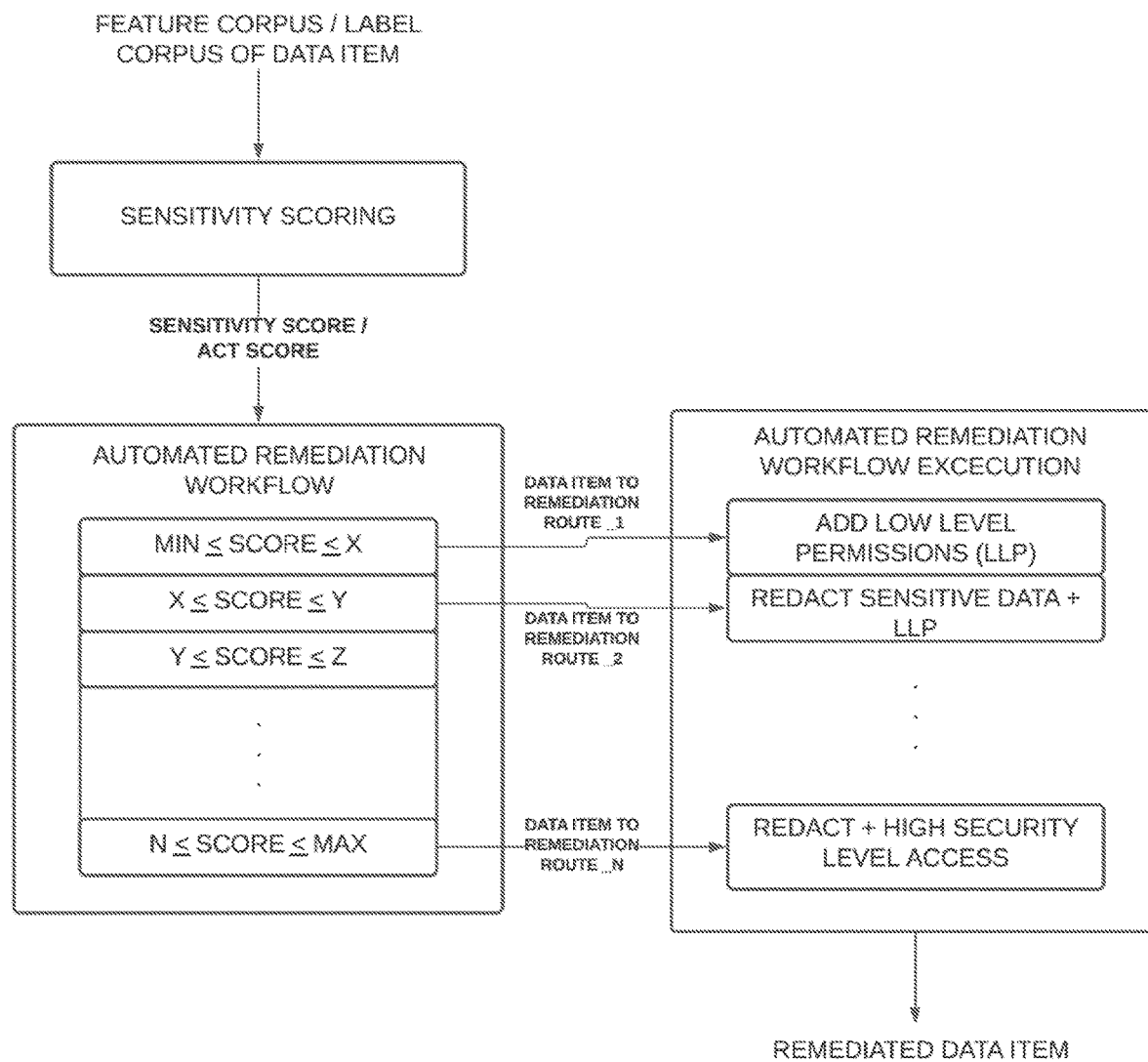
FIG. 7 illustrates a schematic representation of an example of implementing a sensitivity evaluation stage for handling a data item in accordance with one or more embodiments of the present application.

As shown in FIG. 1, a system 100 for intelligent data handling and data governance includes a remote data handling and governance service 105, an access and discovery subsystem 110, a feature identification and classification subsystem 120, a sensitivity mitigation subsystem 130, and a content route handling subsystem 140, as described in U.S. Patent Application No. 63/215,203 and U.S. patent application Ser. No. 17/849,555, which are incorporated herein in their entireties by this reference. The system 100 may sometimes be referred to herein as an intelligent data handling and data governance system 100 or simply the data handling system 100.

1.05 Intelligent Content Access+Content Handling Subsystem

The data handling and governance service 105, sometimes referred to herein as the "data handling service 105" may be implemented by a distributed network of computers and may be in operable and control communication with each of the subsystems of the system 100. That is, the data handling service 105 may include a centralized controlling computer server(s) and associated computing systems that encourages and/or controls the intelligent data handling, data classification, and data governance operations of each of the subsystems 110-140.

In one or more embodiments, the data handling service 105 may function to implement a data handling and data governance application programming interface (API) that enables programmatic communication and control between the data handling system 100 and the one or more sub-services therein and APIs of the one or more subscribers to the data handling service 105 of the data handling system 100.

1.1 Content Access+Discovery Subsystem

The access and discovery subsystem 110, which may be sometimes referred to herein as the "discovery subsystem" or "discovery subservice", preferably functions to enable one or more electronic connections between the data handling system 100 and one or more external systems of one or more subscribers to the data handling service 105. The discovery subsystem may include one or more access modules that may function to establish or create content communication channels, which are sometimes referred to as "migration nexus" or "data handling nexus", between the data handling system 100 and subscriber systems. In one or more embodiments, the data handling nexus may include any suitable medium and/or method of transmitting digital items between at least two devices including, but not limited to, a service bus, a digital communication channel or line, and/or the like.

The discovery subsystem 100 may additionally or alternatively include one or more discovery submodules that perform one or more content discovery actions and/or functions for identifying existing file and content systems within a computing architecture of a subscriber.

1.2 Content Feature Identification and Classification Subsystem

The feature identification and classification subsystem 120, which may sometimes be referred to herein as a "classification subsystem", preferably functions to compute one or more classification labels for each target file or target content being migrated and/or handled by the data handling system 100.

In one or more embodiments, the classification subsystem 100 includes a machine learning module or subsystem that may be intelligently configured to predict various classifications for each target file or target document including, but not limited to, identifying a document type, identifying sensitive information, identifying a document's language (e.g., via a language detection model), identifying objects or images, identifying document form values, and/or the like. In such embodiments, the classification subsystem 100 may include a plurality of distinct machine learning-based classification submodules, which may be outlined herein below in the method 200.

Additionally, or alternatively, in some embodiments, the classification subsystem 100 may include one or more content classification modules that include extensible classification heuristics derived from one or more of subscriber-defined content policy and/or data handling service-derived content policy.

Additionally, or alternatively, the classification subsystem 100 may implement one or more ensembles of trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

1.3 Content Sensitivity Mitigation Subsystem

The sensitivity mitigation subsystem 130 preferably functions to perform one or more automated actions that reduces a sensitivity of a target file or target content or otherwise, improves a security of a target file or target content for protecting sensitive or secure content/information. Sensitive information or data preferably relate to data that must be guarded from unauthorized access and unwarranted disclosure to maintain the information security of an individual or an organization. In one or more embodiments, sensitive information may be defined based on subscriber information security policy or file system policy. In some embodiments, sensitive information may be defined based on data handling service-defined file system policy.

The sensitivity mitigation subsystem 130 may include a plurality of distinct automated sensitivity mitigation workflows or the like to which a target file or target content may be intelligently routed based on classification data.

1.4 Automated Document Identification Module

The content route handling subsystem 140 preferably functions to intelligently route each target file or target content based on classification inferences or predictions of the classification subsystem 120. In some embodiments, a succeeding or new file system of a subscriber may include a predetermined configuration for ingesting and/or storing target digital items and content. In such embodiments, the content route handling subsystem 140 may be configured based on the storage parameters and/or configurations of the succeeding file system(s) and perform a routing of target files and target content to appropriate regions or partitions of the succeeding file system(s).

Additionally, or alternatively, the content route handling subsystem 140 may function to route distinct target files and/or target content to the sensitivity mitigation subsystem 130 based on the one or more features discovered and classifications of the classification subsystem 120.

2. Method for Classification-Informed Automated Remediations of Data Items

As shown in FIG. 2, a method 200 for classification-based automated remediations and handling of data items may include sourcing or accessing data items S210, implementing a classification stage of a data handling pipeline S220, evaluating a sensitivity of a target data item S230, identifying an automated remediation workflow S240, and implementing one or more automated remediations S250.

2.1 Sourcing/Accessing Data Items Via Data Handling API

S210, which includes sourcing or accessing data items, may function to implement an intelligent data handling API that interfaces with one or more sources of data items. In one or more embodiments, the intelligent data handling API may be agnostic to data corpus types and/or sources of data items and therefore may function to establish a connection with any eclectic sources of data including structured and unstructured sources of data (e.g., SHAREPOINT, BOX, GOOGLE DRIVE, DROPBOX, electronic content management systems (ECMs), email/email attachments, SLACK, TEAMS, chat messaging and various messaging systems, and/or the like) for performing one or more data handling tasks.

In a preferred embodiment, S210 may function to discover and/or access any suitable type or kind of data items including, but not limited to, data items from structured data sources and unstructured data sources. The data items may include any type or kind of data item including, for example, but should not be limited to, electronic documents, text message data, chat messaging data, applications data, digital media, video recordings/messages, files, audio recordings/messages, image data, and/or the like. Accordingly, any suitable data repository including, for example, electronic communication data (e.g., emails), chat messaging repositories, data compression repositories, and/or the like may be identified in a discovery phase and scanned for an intelligent migration or similar routing or data handling.

In such preferred embodiment, S210 may function to implement the intelligent data handling API to establish a data handling nexus for each of the one or more distinct sources of data items through which either structured data and/or unstructured data may be accessed, transferred, and/or handled by the API in any suitable manner.

Additionally, or alternatively, S210 may function to implement the intelligent data handling API for directing discovered and/or accessed data items to one or more a flexible classification subsystem and machine learning-based sensitivity scoring subsystem. That is, in such embodiments, the intelligent data handling API may be in operable communication with a data handling pipeline that includes one or more of the flexible classification subsystems, the machine learning-based sensitivity scoring subsystem, data item remediation subsystems, and may actively route data items from their source location (e.g., a file repository or the like) into the data handling pipeline.

In one or more embodiments, after a processing of one or more data items through the data handling pipeline, S210 may function to implement the data handling API for re-positioning the one or more data items within an original source location or within a distinct storage system.

Additionally, or alternatively, the intelligent data handling API may include an event-based API, such as a REST API. In such embodiment, a client or the like may interface with the intelligent data handling API to provide data items which may not otherwise be accessible via the one or more data handling nexus of the API as well as make API calls regarding any data item or the like being handled by the intelligent data handling API.

It shall be recognized that, while the one or more data handling components of the present application may be described as arranged within a data handling pipeline stage, a target data item may enter or exit the data handling pipeline at any stage. Additionally, or alternatively, the distinct stages and/or data handling components may be arranged in any suitable manner throughout the data handling pipeline for achieving any of the objectives described herein.

2.2 Data Handling Pipeline|Data Item Classification(s)

S220, which includes implementing a classification stage of a data handling pipeline, may function to implement one or more distinct classification modules or subsystems that flexibly classifies and/or produces a machine learning classification inference for each data item sourced via the intelligent data handling API. In one or more embodiments, the one or more classification modules or subsystems may include a plurality of distinct classifying modules including machine learning-based classifiers and heuristic-based classifiers.

In one or more embodiments, the data handling pipeline may include implementing a data handling queue that may function to sequence and/or prioritize the handling (e.g., migrations or the like) of discovered and/or accessed data items, such as files and/or content data, from one or more data sources. In such embodiments, the data handling queue may function to manage a throughput of each of a plurality of data items within the data handling queue into the one or more classifiers of the data handling pipeline. In some embodiments, the data handling queue may function to enable a synchronous processing of each of the plurality of data items pending in the queue. In such embodiments, S220 may function to implement the data handling queue for serially or sequentially providing each data item as input into either through the machine learning classifier(s) first and secondly through the heuristics-based classifier or vice-versa. Alternatively, S220 may function to implement the data handling queue for an asynchronous processing of the plurality of data items pending in the queue such that multiple distinct data items may be processed through the data handling pipeline without regard to processing states of other data items within the pipeline. Additionally, or alternatively, S220 may function to implement the data handling queue for processing a data item in a parallel manner through the multiple distinct classifiers of the data handling pipeline. In one example, the data handling queue may function to create copies of a target data item and provide the copies in parallel through the multiple distinct classifiers of the data handling pipeline. In this way, S220 may function to compute a global classification label and/or meta-score in an efficient manner.

Additionally, or alternatively, S220 may function to implement one or more feature extractors that operate to extract content and/or metadata features from each target data item of a corpus. In such embodiments, S220 may function to create for each target data item a feature corpus or feature container that, respectively, include the feature data or the like extracted from each respective target data item. In some embodiments, S220 may function to implement multiple distinct features extractors, such as a first content feature extractor, a second metadata feature extractor, a third sensitive data (e.g., personally identifiable data) extractor, and/or the like. In such embodiments, S220 may function to create a distinct feature corpus for storing feature data extracted by each respective extractor. Alternatively, S220 may use a combination of or an integration of multiple feature extractors and store the feature data in a single corpus.

2.2 (i) Machine Learning-Based Data Item Classifier(s)

In a preferred embodiment, the data item machine learning classifier comprises an ensemble of distinct machine learning classifiers. In such preferred embodiment, each distinct machine learning classifier defining the ensemble may be specifically configured and/or trained to perform a distinct or specific machine learning classification task that may be considered in the aggregate to compute an overall or global classification for a given data item. Additionally, or alternatively, in some embodiments, the outputs of each machine learning classification task of the ensemble may define some component of a meta-score or machine learning (data item) score that may be used to identify one or more automated tasks and/or automated workflows for handling the data item according one or more of subscriber-defined data handling policy and service-provider defined data handling policy. In such embodiments, the global classification and/or machine learning score for a given data item may be computed by a consensus module or mechanism that may function to weigh a combination of the outputs of each distinct classifier of the ensemble and compute the global classification and/or meta-score based on a weighted or averaged calculation of the combination of classifier outputs.

Additionally, or alternatively, in one or more embodiments, an operation of the ensemble of distinct machine learning classifiers may be governed or informed by an intelligent model arbiter or intelligent model conductor. In such embodiments, the arbiter or conductor may selectively activate or enable only a subset of the distinct machine learning classifiers of the ensemble of distinct machine learning classifiers for producing one or more classification labels for a data item. Accordingly, in one or more embodiments, the global classification and/or the machine learning score (e.g., meta-score) for a given data item may be composed based on the predictions and/or outputs of the enabled machine learning classifiers within the subset.

The ensemble of distinct machine learning classifiers may include a combination or a sub-combination of one or more of the following including, but not limited to, an extensible document classifier, an out-of-scope classifier, a machine learning-based personally identifiable information (PII) classifier, a language classifier, object classifier, and the like.

It shall be recognized that the ensemble of distinct machine learning classifiers may be extensible and/or malleable to include new and/or a different combination of distinct machine learning classifiers. In one or more embodiments, an ensemble of distinct machine learning classifiers may include a combination of subscriber-agnostic and subscriber-specific machine learning classifiers. In such embodiments, subscriber-specific machine learning classifiers may be trained with one or more corpora of training data samples sourced from a specific subscriber. Accordingly, once trained with the subscriber-specific corpora of training data samples, the machine learning classifier may be selectively enabled within the ensemble for classifying data items sourced from the subscriber.

2.2 (ii) Heuristic-Based Data Item Classifier(s)

In a preferred embodiment, the heuristics-based data item classifier comprises one or more extensible heuristics-based classification modules (classifiers) that may function to apply one or more heuristics against one or more features of a target data item to produce and/or apply one or more classification labels for the target data item. In one or more embodiments, the heuristic-based data item classifier comprises a composition of a plurality of distinct heuristic-based classifiers that may each operate to evaluate a target data item and produce distinct classification labels for different based on distinct subsets of features of a target data item. That is, in such embodiments, each distinct heuristic-based classifier may function to receive a distinct set of feature inputs extracted from a target data item for produce a respective classification label.

In one or more embodiment embodiments, the one or more extensible heuristics-based classification modules may include a combination or a sub-combination of one or more of the following including, but not limited to, a personally identifiable information classifier, an extensible document archetype-based classifier, any suitable regular expression (regex) and pattern-based matching classifiers, and/or the like.

In some embodiments, the extensible document archetype-based classifier may include an information retrieval-type classifier that may function to compute an embedding value for a target data item and evaluate the embedding value against a data item embedding space that includes a plurality of embedding values for various types of data items. In such embodiment, S220 may function perform a similarity analysis based on a shortest distance between the embedding values of the target data item and embedding values within the data item embedding space. That is, in some embodiments, a collection of embedding values (e.g., sentence/word vector values) may be computed based on content of a target data item. In such instances, the collection of embedding values of the target data item may be evaluated against distinct collections of embedding values for other data items mapped to an n-dimensional space. Accordingly, S220 may function to identify like or similar data items based on identifying one or more collections of embedding values of the n-dimensional space that may be nearest the collection of embedding values of the target data item.

Additionally, or alternatively, the extensible document archetype-based classifier may include a document hashing-type classifier that may function to hash a target data item into a binary encoding. In such embodiments, S220 may function to evaluate the hash or binary encoding of the target data item to determine a similarity value or similarity score between the hash of the target data item and other hash values for various, distinct target data items.

Label-Informed Task Augmentation

Additionally, or alternatively, in response to computing a classification label for a target data item, S220 may function to map, append, or associate, as metadata to the target data item or classification label, a corpus of remediation instructions or scripts, that when executed, automatically perform one or more remediation actions for resolving one or more identified risks or issues with a target data item. That is, in addition to producing a classification label for a target data item, S220 may function to append or augment one or more tasks or actions that may address a data handling requirement associated with a data item having the predicted/computed classification label.

Additionally, or alternatively, S220 may function to implement a remediation or file handling reference source, such as a reference table, file handling matrix, or any suitable data structure, that electronically maps or links each of a plurality of distinct classification labels for a target data item to a set or a corpus of remediation instructions that may be specifically tailored for handling and/or routing based on the classification of the target data item. Thus, in some embodiments, for each distinct target data item having an associated classification, a differentiated set of remediation or digital file handling instructions may be appended to the target data item and automatically executed to remediate any identified deficiency or issue associated with a target data item.

It shall be recognized that the one or more data handling tasks/actions that may be attached to a target data item or associated classification label of the target data item may include instructions for performing one or more automated data handling workflows and/or one or more automated sequence of tasks that may remediate one or more deficiencies of a present condition or state of the target data item.

Additionally, or alternatively, in response to or based on the various machine learning-based classifications of a corpus of digital items and/or files, S220 may function to curate a plurality of distinct sub-corpora of digital files or the like based on the machine learning-based classification inference for each distinct digital file or item of content with the corpus of digital items. In a preferred embodiment, the machine learning-based classification inference may be converted to a classification label of a plurality of recognized classification labels. In some embodiments, each of the plurality of distinct sub-corpus may be defined by including digital files or items of content having a specific or designated classification label. That is, each sub-corpora may be associated with a distinct classification label of a plurality of recognized classifications or categories of digital files and may function to include and/or store only or primarily digital files or item having been assigned a classification label matching the classification label of the sub-corpora.

Additionally, or alternatively, curating the plurality of distinct sub-corpora of digital files may include tuning, via a graphical user interface, one or more digital file curation criteria. The one or more digital file curation criteria may preferably include criteria that enables an identification of digital files that may include a feature that matches or substantially matches the one or more digital file curation criteria. As a non-limiting example, digital file curation criteria may include a digital file size, a file classification, content features (e.g., values, images, text content, audio content, etc.) within the file, storage location of the file, and/or the like.

2.3 Data Handling Pipeline|Sensitivity Scoring Stage

S230, which includes evaluating a sensitivity of a target data item, may function to implement a sensitivity scoring stage for computing a sensitivity value for the target data item. In such embodiments, the data handling pipeline may include a sensitivity scoring stage for identifying whether a target data item includes sensitive information and/or for identifying a degree of sensitive information that may be associated with the target data item.

In a preferred embodiment, the sensitivity scoring stage includes a machine learning-based sensitivity scoring model. In a first implementation, the sensitivity scoring model may include a global sensitivity scoring model that may be trained on one or more corpora of sensitivity training samples sourced from a plurality of distinct data sources and/or subscribers. In a second implementation, the sensitivity scoring model may include a subscriber-specific sensitivity scoring model that may be configured based on subscriber-specific sensitivity policy, which may define one or more algorithmic features (e.g., learnable features) of the model, and based on one or more corpora of sensitive training samples sourced from the subscriber.

In operation, S230 may function to implement the machine learning-based sensitivity scoring model to compute a sensitivity (risk) value based on a feature vector corpus for a target data item. In a preferred embodiment, a sensitivity score may relate to a machine learning-computed probability or likelihood that a target data item content includes sensitive data or information. In some embodiments, a sensitivity score may take a value between zero (0) and one hundred (100) where a value at or relatively closer to 0 indicates a lower likelihood of sensitivity and a computed value at or relatively closer to 100 may indicate a higher likelihood that a target piece of content includes sensitive data. It shall be recognized that the sensitivity score may be any suitable value or alphanumeric range (e.g., A, B, C or 1-5, etc.)

In one or more embodiments, S230 may function to compute a sensitivity score that may be a composition of a plurality of sub-sensitivity scores produced by each of a plurality of distinct sensitivity scoring machine learning models. In such embodiments, the composed sensitivity score may be an average of the individually computed sensitivity scores or inferences. In another embodiments, S230 may function to weight the computed sensitivity values may be weighted differently within the composition, such that each distinct sensitivity score contributes differently to the composed or final sensitivity score output.

In some embodiments, S230 may function to use the sensitivity score as an input signal to drive or inform a digital file handling or a remediation routing of a target data item, as described in more detail below.

2.4 Configuring Automated Actions+Automated Remediation Workflows

Optionally, or additionally, S240, which includes configuring an automated remediation workflow, may function to create and configure an automated remediation workflow for automatically executing one or more digital file handling or remediation actions against a target data item based on evaluating a computed machine learning-based sensitivity score for a target item against one or more distinct remediation stages of the automated remediation workflow.

In one or more embodiments, S240 may function to configure an automated remediation workflow to include multiple distinct remediation stages that each include criteria for evaluating at least a computed sensitivity score for a target data item. Additionally, or alternatively, each configured automated remediation or data handling workflow may include a sequence of computer-executable tasks or operations that, when executed, operates to modify one or more of a storage residency, access permissions, and file metadata associated with each distinct digital file of a corpus of digital files. In such embodiments, via S240, two or more computer-executable tasks or document handling operations may be tethered together into a series or sequence of actions to be executed against a corpus of digital files or items of digital content.

In a preferred embodiment, evaluation criteria for a given remediation stage may include one or more of a set sensitivity score range (e.g., 80 to 90) a score threshold (e.g., > or =90) against which a given sensitivity score for a target data item may be compared for validating or invalidating a distinct remediation route or one or more distinct remediation actions assign to the remediation stage. In this preferred embodiment, evaluation criteria that includes a distinct sensitivity score range or a sensitivity score threshold may be set for each of the multiple distinct remediation stages of the automated remediation workflow.

In one or more embodiment, a setting of the evaluation criteria at each remediation stage of an automated remediation workflow may be based on data handling policy for a given subscriber. That is, in one or more embodiments, the evaluation criteria at each of the multiple, distinct remediation stages of a given automated remediation workflow may be set by or based on a subscriber's requirements and/or criteria. In some embodiments, a setting of the evaluation criteria at each remediation stage of an automated remediation workflow may be based on service-provider defined criteria. In such embodiments, a service-provider implementing the system 100 and/or method 200 may function to define evaluation criteria based on an evaluation of existing evaluation criteria for cohorts (e.g., like-subscribers) of a subscriber and/or based on an evaluation of similar or same automated remediation workflows for a data item that is similar or the same as the target data item that may be a subject of the automated remediation workflow.

In such embodiments, S240 may function to convert a digital file handling policy of a subscriber to digital decisioning logic for a given automated digital file handling and remediation workflow. The converting, in some embodiments, may include setting or defining at least one distinct computer-executable task of the automated digital file handling workflow to each distinct policy criterion of the digital file handling policy.

Additionally, or alternatively, S240 may function to configure the one or more remediation routes or remediation actions assigned to each distinct remediation stage of a given automated remediation workflow. In one or more embodiments, each distinct remediation may be assigned a distinct one or set of remediation routes and/or remediation actions. For example, a first remediation stage may be assigned a remediation action that causes an automatic encryption of a target data item, a second remediation stage may be assigned a remediation action that causes a redaction of the target data item, and a third remediation stage may be assigned a remediation route that causes an automatic relocation of a target data item from a first storage location to a second storage location (e.g., move to EU datacenter, etc.). One or more examples of remediation actions and remediation routes include, but should not be limited to, encryption, redaction, a movement (e.g., changing repository, setting access, setting MFA, archival, manual review queue, triggering compliance workflows, triggering best efforts workflows, setting/removing access controls, setting/removing permissions, setting/removing links, and/or the like).

Additionally, or alternatively, one or more stages of the multiple, distinct remediation stages of an automated remediation workflow may be configured with additional evaluation criteria including feature criteria. That is, in addition to a first criteria for evaluating a computed sensitivity score of a target data item, a given remediation stage may include one or more additional criteria relating to features of the target data item. For example, a first feature criteria of a first stage may require an existence of a distinct term or embedding vector of a word/feature within the target data item. Thus, in this first example, both the sensitivity scoring criteria and the feature criteria may be evaluated and should be satisfied to trigger an associated remediation action or remediation route. Other feature criteria may relate to any type or kind of feature that may be included in a feature container for the target data item and/or a classification label associated with the target data item.

It shall be recognized that in addition or in lieu of the sensitivity score, S240 may function to configure an automated remediation workflow with meta-score criteria, ACT score criteria, specific (extractable) features of a target data item, and/or the like.

It shall also be recognized that an implementation and/or selection of available remediation actions and automated remediation workflows may be controlled and/or informed by a subscriber's remediation cost-remediation benefit parameters or data handling policy. In such instances, a control of remediation applications and dynamics by a subscriber or the like may be enabled with subscriber abilities to assign cost values for a range of remediation data items (e.g., fully remediated, partially remediated, and non-remediated data items, and the like) and similar computations of remediation costs and benefits based on a discovery of cost saving (e.g., mitigated risk cost per data item multiplied by a number of data items) and risk exposure (e.g., unmitigated risk cost per data item multiplied by a number of data items).

Additionally, or alternatively, S240 may include executing a simulation and/or testing of a configured automated remediation workflow or automated digital file handling workflow. In some embodiments, once an automated remediation workflow may be established, created, or configured, S240 may function to execute a simulation of the automated digital file handling workflow against a simulation or test corpus of sample digital items and/or files. In such embodiments, the simulation or test corpus may include a combination of digital files and/or items of digital content in which the properties and/or classifications have been previously recognized or known. S240, in one embodiment, may function to compute one or more efficacy or performance metrics of the automated digital file handling workflow as applied against the simulation corpus. In such embodiment, the one or more efficacy or performance metrics may include an accuracy in the one or more classifications of the distinct digital items of the simulation corpus, an execution of a policy-driven remediation or handling of the digital items, and/or an efficiency of executing one or more computer-executable tasks against an entirety of the simulation corpus. It shall be recognized that S240 may function to measure or compute any suitable performance metric or similar efficacy values for any given automated digital file handling workflow.

Additionally, or alternatively, S240 may function to evaluate the computed performance or efficacy metrics of a simulated automated digital file handling workflow against an efficacy threshold or the like (e.g., a minimum accuracy value, a minimum efficiency value, a minimum execution value, or the like). In one embodiment, if the automated digital file handling workflow satisfies or exceeds the efficacy threshold, S240 may function to propose a deployment or may function to automatically deploy the automated digital file handling workflow. Alternatively, if the automated digital file handling workflow does not satisfy the efficacy threshold, S240 may function to propose a tuning of one or more configurations of the automated digital file handling workflow that may improve the efficacy of the automated digital file handling workflow to or beyond the efficacy threshold.

2.5 Label-Informed Automated Remediation Actions|ML Score-Informed Automated Remediation Workflows S250, which includes implementing a data item remediation stage of a data handling pipeline, may function to automatically execute one or more automated remediation actions for a target data item based on classification label and remediation instructions and/or automatically execute one or more automated remediation workflows for the target data item based on sensitivity evaluation data.

In one or more embodiments, S250 may function to direct a target data item to one or more of an automated remediation actions stage and one or more automated remediation workflows stage based on one or more classification labels, one or more automated remediation instructions, and/or one or more sensitivity values associated with the target data item.

In some embodiments, if insufficient classification labeling and/or sensitivity scoring is performed or cannot be performed for a target data item, S250 may function to bypass an automated remediation stage of the data handling pipeline and may function to direct the target data item to one of a data item review queue and a data item re-storing module for storing the target data item in an appropriate data repository preferably according to data item handling policy.

Implementing Automated Remediation Actions

In one or more embodiments, S250 may function to direct a target data item to an automated remediations actions stage of the data handling pipeline when or if the target data item has been assigned or may be associated with automated remediation instructions. In a preferred embodiment, the automated remediations actions stage includes an automated remediations module or engine that functions to execute remediation instructions.

In a first implementation, the automated remediation instructions appended to or associated with the target data item and/or to one or more classification labels of the target data item may include a list of proposed remediation tasks and/or identifiers of one or more remediation tasks. In this first implementation, S250 may function to use either the list of tasks or one the one or more identifiers of the one or more remediation tasks to lookup, identify, or access the corresponding program and/or execution remediation action instructions. In response to identifying the executable remediation action instructions, S250 may function to automatically perform one or more remediations of the target data item.

In a second implementation, the automated remediation instructions may include computer-executable instructions, subroutines, scripts, or the like that may function to travel with the target data item. In such embodiments, upon receipt of the target data item and the automated remediation instructions, S250 may function to automatically execute the automated remediation instructions for performing one or more remediations of the target data item.

Implementing Automated Remediation Workflows

In one or more embodiments, S250 may function to direct a target data item to one or more automated remediation workflows based on one or more of the one or more classification labels and sensitivity values of a target data item.

In some embodiments, the automated remediation stage may include a plurality of distinct automated remediation workflows. In such embodiments, each distinct automated remediation workflow may be configured to evaluate and/or handle a target data item having a distinct or a set of distinct classification labels. For instance, a first classification label (e.g., financial document) may cause a target data item to be directed to a first automated remediations workflow (that handles financial documents). A second classification label (e.g., transaction record/receipt) may cause a target data item to be direct to a second automated remediations workflow (that handles transaction records). Accordingly, a selection of and/or an instantiation of one or more automated remediation workflows for a target data item may be informed by or based on the classification labels computed for the target data item.

It shall be recognized that S250 may function to select and/or instantiate multiple, distinct automated remediation workflows based on the classification labels of a target data item and correspondingly, direct the target data item for evaluation to each of the selected automated remediation workflows. In some embodiments, if multiple automated remediation workflows are selected, S250 may function to execute a processing of the target data item at each workflow in parallel or in a sequential manner.

Upon receipt or in response to receiving evaluation data of a target data item, which may include classification label data, sensitivity scoring data, and/or feature data of the target data item, S250 may function to flow the evaluation data sequentially along the remediation stages of each of the one or more automated remediation workflows. In such embodiments, the evaluation data of the target data item may be compared against the evaluation criteria (e.g., sensitivity score range and feature match) of a given remediation stage and S250 may function to determine when or if the evaluation data satisfies the evaluation criteria. Accordingly, when the evaluation data of a target data item satisfies or matches the evaluation criteria of a given remediation stage of a workflow, S250 may function to direct the target data item along the corresponding remediation route assigned to the remediation stage. In such embodiments, the remediation route may include one or more automated remediation actions that, when executed, remediates the target data item.

It shall be recognized that the automated remediation actions stage and the automated workflows remediation stage may be described as independent and/or distinct stages of the data handling pipeline, in some embodiments, the stages may be combined into a single stage and/or rearranged in any suitable manner.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A machine learning-informed method implemented by one or more computers executing automated digital file handling instructions, the method comprising:

at a remote digital file handling service:
  prioritizing, within a data handling queue, each digital file of a plurality of distinct digital files obtained via one or more data sources of a subscriber to the remote digital file handling service, wherein the data handling queue manages an asynchronous throughput of each digital file of the plurality of distinct digital files into one or more file classification machine learning models;
  computing, by the one or more file classification machine learning models, at least one machine learning classification label for each digital file of the plurality of distinct digital files of a corpus of digital files;
  curating a plurality of distinct sub-corpora of digital files based on the at least one machine learning classification label associated with each digital file of the plurality of distinct digital files of the corpus of digital files, wherein the at least one machine learning classification label comprises at least one digital file type classification label of a plurality of distinct digital file type classification labels;
  implementing a file handling reference table that electronically maps each of the plurality of distinct digital file type classification labels to a set of file handling instructions of a plurality of distinct automated digital file handling instructions;
  using the file handling reference table to select a distinct set of automated digital file handling instructions for each of the plurality of distinct sub-corpora of digital files based on the at least one digital file type classification label associated with each of the plurality of distinct sub-corpora of digital files, wherein given automated digital file handling instructions of the plurality of distinct automated digital file handling instructions, when executed, digitally modify a state of a target digital file of a given one of the plurality of distinct sub-corpora of digital files;
  wherein the data handling queue:
    creates a copy of each digital file of the plurality of distinct digital files, and
    inputs the copy of each digital file of the plurality of distinct digital files to multiple distinct classifiers of the one or more file classification machine learning models;
  receiving by a consensus computer a classification output from each of the multiple distinct classifiers;
  computing, by the consensus computer, a classification meta-score value based on a weighted combination of the classification output from each of the multiple distinct classifiers, wherein selecting the distinct set of automated digital file handling instructions is further based on the classification meta-score value;
  testing an efficacy of the distinct set of automated digital file handling instructions for digitally modifying a state of each digital file of a target sub-corpus of digital files of the plurality of distinct sub-corpora of digital files, wherein the testing causes a simulated application of the distinct set of automated digital file handling instructions against the target sub-corpus; and
  executing, by one or more computers, the distinct set of automated digital file handling instructions associated with the target sub-corpus if the efficacy identified during the testing satisfies a minimum efficacy value.

2. The method according to claim 1, wherein curating the plurality of distinct sub-corpora of digital files includes composing each distinct sub-corpus of the plurality of distinct sub-corpora of digital files based on the at least one digital file type classification label associated with each digital file of the plurality of distinct digital files of the corpus of digital files, wherein each distinct sub-corpus comprises one or more digital files associated with a distinct one of the plurality of distinct digital file type classification labels.

3. The method according to claim 1, further comprising: configuring the automated digital file handling instructions include:
  (i) selecting, via a graphical user interface, two or more distinct digital file handling actions;
  (ii) tethering the two or more distinct digital file handling actions into a sequence of computer-executable tasks using one or more logic instructions.

4. The method according to claim 3, further comprising: configuring the automated digital file handling instructions include:
  converting digital file policy criteria of a target digital file handling policy to digital decisioning logic for automatically handling one or more target digital files of a subscriber, wherein the converting includes setting or defining at least one distinct computer-executable task of the automated digital file handling instructions to each distinct criterion of the digital file handling policy.

5. The method according to claim 1, wherein curating the plurality of distinct sub-corpora of digital files includes tuning one or more digital file curation criteria including:
  (i) setting a minimum confidence threshold for the at least one digital file type classification label; and
  (ii) setting one or more digital file feature criteria using Boolean logic.

6. The method according to claim 1, further comprising: computing, by one or more sensitivity classification machine learning models, at least one machine learning sensitivity inference for each of the plurality of distinct digital files of the corpus of digital files,
  wherein the at least one machine learning sensitivity inference relates to a machine learning-derived probability or likelihood that a given digital file contains access-restricted content data as defined by a digital file handling policy of the subscriber to the remote digital file handling service.

7. The method according to claim 6, further comprising:
computing a digital content risk score for each of the plurality of distinct digital files of the corpus of digital files based on the at least one machine learning sensitivity inference computed for each of the plurality of distinct digital files of the corpus; and
validating or invalidating the distinct set of automated digital file handling instructions associated with the target sub-corpus based on comparing the digital content risk score to a sensitivity score range.

8. The method according to claim 6, further comprising:
identifying the digital file handling policy of the subscriber associated with the corpus of digital files for each of the plurality of distinct digital files based on the at least one machine learning classification label for each of the plurality of distinct digital files; and
computing a digital content risk score for each of the plurality of distinct digital files of the corpus of digital files based on:
(a) the at least one machine learning sensitivity inference computed for each of the plurality of distinct digital files of the corpus; and
(b) the digital file handling policy of the subscriber.

9. The method according to claim 8, further comprising:
identifying, via a graphical user interface, a distinct sub-corpus of digital files of the plurality of distinct sub-corpora of digital files having a distinct digital content risk score satisfying a content risk threshold; and
automatically selecting, via the graphical user interface, at least one set of automated digital file handling instructions that mitigates the distinct digital content risk score of the distinct sub-corpus of digital files.

10. The method according to claim 1, wherein:
the remote digital file handling service stores a plurality of distinct digital file handling policies of the subscriber, and
each distinct digital file handling policy of the plurality of distinct digital file handling policies includes one or more predefined instructions for modifying the state of the target digital file based on a machine learning-based inference relating to content of the target digital file.

11. The method according to claim 1, further comprising:
downloading, from one or more computers of the subscriber, the corpus of digital files to the remote digital file handling service,
wherein the corpus of digital files comprises a first set of digital files having structured data and a second set of digital files having unstructured data of the subscriber.

12. The method according to claim 1, wherein
the distinct set of automated digital file handling instructions for each of the plurality of distinct sub-corpora of digital files includes a sequence of computer-executable tasks that, when executed, automatically alters a storage residence of the target digital file from a first storage location within a file system to a second storage location within a distinct file system.

13. The method according to claim 1, wherein the distinct set of automated digital file handling instructions for each of the plurality of distinct sub-corpora of digital files includes a sequence of computer-executable tasks that, when executed, automatically alters a permissioning state of the target digital file from a first access permissions to a second access permissions.

14. The method according to claim 1, wherein
the at least one digital file type classification label relates to a machine learning prediction of a recognized digital file type of a plurality of distinct recognized digital file types of the subscriber of the remote digital file handling service.

15. The method according to claim 1, wherein if the one or more file classification machine learning models output insufficient classification labeling for the target digital file, bypassing the distinct set of automated digital file handling instructions and routing the target digital file from the data handling queue to a data item review queue.

16. A machine learning-informed method implemented by one or more computers executing automated digital content handling instructions, the method comprising:
prioritizing, within a data handling queue, each item of a plurality of distinct items of digital content obtained via one or more data sources of a subscriber to a remote digital content handling service, wherein the data handling queue manages an asynchronous throughput of each item of the plurality of distinct items of digital content into one or more digital content classification machine learning models;
computing, by the one or more digital content classification machine learning models, at least one machine learning classification label for each of the plurality of distinct items of digital content of a corpus of items of digital content;
curating a plurality of distinct sub-corpora of items of digital content based on the at least one machine learning classification label associated with each of the plurality of distinct items of digital content of the corpus of items of digital content, wherein the at least one machine learning classification label converts to at least one digital content type classification label of a plurality of distinct digital content type classification labels;
implementing a content handling reference table that electronically maps each of a plurality of distinct digital content type classification labels to a set of content handling instructions of a plurality of distinct automated digital content handling instructions;
using the content handling reference table to select a distinct set of automated digital content handling instructions for each of the plurality of distinct sub-corpora of digital content based on the at least one digital content type classification label associated with each of the plurality of distinct sub-corpora of digital content,
wherein the data handling queue:
creates a copy of each digital item of the plurality of items of digital content, and
inputs the copy of each digital item of the plurality of items of digital content to multiple distinct classifiers of the one or more digital content classification machine learning models;
receiving by a consensus computer a classification output from each of the multiple distinct classifiers;
computing, by the consensus computer, a classification meta-score value based on a weighted combination of the classification output from each of the multiple distinct classifiers, wherein selecting the distinct set of automated digital content handling instructions is further based on the classification meta-score value;
testing an efficacy of the distinct set of automated digital content handling instructions for a target sub-corpus of items of digital content of the plurality of distinct sub-corpora of items of digital content, wherein the testing causes a simulated application of the distinct set of automated digital content handling instructions against the target sub-corpus; and executing, by one or more computers, the distinct set of automated digital content handling instructions associated with the target sub-corpus if the efficacy identified during the testing satisfies a minimum efficacy value.

17. A machine learning-informed method implemented by one or more computers executing automated digital file handling instructions, the method comprising:

at a remote digital file handling service:

prioritizing, within a data handling queue, each digital file of a plurality of distinct digital files obtained via one or more data sources of a subscriber to the remote digital file handling service, wherein the data handling queue manages an asynchronous throughput of each digital file of the plurality of distinct digital files into one or more file classification machine learning models;

computing, by the one or more file classification machine learning models, at least one machine learning classification label for each digital file of the plurality of distinct digital files of a corpus of digital files;

curating a plurality of distinct sub-corpora of digital files based on the at least one machine learning classification label associated with each digital file of the plurality of distinct digital files of the corpus of digital files, wherein the at least one machine learning classification label comprises at least one digital file type classification label of a plurality of distinct digital file type classification labels;

implementing a file handling reference table that electronically maps each of a plurality of distinct digital file type classification labels to a set of automated digital file handling instructions of a plurality of distinct automated digital file handling instructions;

using the file handling reference table to select a distinct set of automated digital file handling instructions of the plurality of distinct automated digital file handling instructions for each of the plurality of distinct sub-corpora of digital files based on the at least one digital file type classification label associated with each of the plurality of distinct sub-corpora of digital files, wherein the distinct set of automated digital file handling instructions includes a sequence of computer-executable tasks that, when executed, automatically alters a storage residence of a given digital file of a given one of the plurality of distinct sub-corpora of digital files from a first storage location within a file system to a second storage location within a distinct file system, and wherein the distinct set of automated digital file handling instructions, when executed, digitally modify a state of a target digital file of the given one of the plurality of distinct sub-corpora of digital files;

wherein the data handling queue:

creates a copy of each digital file of the plurality of distinct digital files, and inputs the copy of each digital file of the plurality of distinct digital files to multiple distinct classifiers of the one or more file classification machine learning models;

receiving by a consensus computer a classification output from each of the multiple distinct classifiers;

computing, by the consensus computer, a classification meta-score value based on a weighted combination of the classification output from each of the multiple distinct classifiers, wherein selecting the distinct set of automated digital file handling instructions is further based on the classification meta-score value;

testing an efficacy of the distinct set of automated digital file handling instructions for digitally modifying a state of each digital file of a target sub-corpus of digital files of the plurality of distinct sub-corpora of digital files, wherein the testing causes a simulated application of the distinct set of automated digital file handling instructions against the target sub-corpus of digital files; and executing, by one or more computers, the distinct set of automated digital file handling instructions associated with the target sub-corpus if the efficacy identified during the testing satisfies a minimum efficacy value.

* * * * *